United States Patent
Ortiz Egea (10) Patent No.: US 10,996,335 B2
(45) Date of Patent: May 4, 2021

(54) PHASE WRAPPING DETERMINATION FOR TIME-OF-FLIGHT CAMERA

(71) Applicant: Microsoft Technology Licensing, LLC, Redmond, WA (US)

(72) Inventor: Sergio Ortiz Egea, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 366 days.

(21) Appl. No.: 15/975,710

(22) Filed: May 9, 2018

(65) Prior Publication Data
US 2019/0346570 A1  Nov. 14, 2019

(51) Int. Cl.
| G01S 17/89 | (2020.01) |
| G01S 7/486 | (2020.01) |
| H04N 5/33 | (2006.01) |
| G01S 17/42 | (2006.01) |
| G01S 7/4863 | (2020.01) |
| G01S 7/4865 | (2020.01) |

(Continued)

(52) U.S. Cl.
CPC ............ *G01S 17/42* (2013.01); *G01S 7/4863* (2013.01); *G01S 7/4866* (2013.01); *G01S 17/894* (2020.01); *H04N 5/2226* (2013.01); *H04N 5/23216* (2013.01); *H04N 5/33* (2013.01)

(58) Field of Classification Search
CPC ...... G01S 17/89; G01S 7/4863; G01S 7/4866; G01S 17/42; G01S 17/894; H04N 5/2226; H04N 5/23216; H04N 5/33
USPC ....................................................... 356/5.01
See application file for complete search history.

(56) References Cited

U.S. PATENT DOCUMENTS 5,796,859 A * 8/1998 Mammone ........... G01B 11/255
                                                      351/212
6,288,776 B1    9/2001 Cahill et al.
(Continued)

FOREIGN PATENT DOCUMENTS

WO       2017149370 A1    9/2017

OTHER PUBLICATIONS

Conroy, et al., "A power-saving modulation technique for time-of-flight range imaging sensors", In Proceedings of SPIE Videometrics, Range Imaging, and Applications XI, vol. 8085, Jun. 21, 2011, 13 Pages.

(Continued)

*Primary Examiner* — Daniel L Murphy
(74) *Attorney, Agent, or Firm* — Alleman Hall Creasman & Tuttle LLP (57) ABSTRACT

A time-of-flight (ToF) camera is configured to illuminate a subject with IR light. For each sensor of a sensor array, camera space coordinates of a locus of the subject are determined based on the measured IR light. The camera space coordinates include a phase difference between emitted IR light and reflected IR light. A plurality of candidate positions of the locus of the subject are determined in world space based on the camera space coordinates. Each candidate position corresponds to a different phase wrapping of the phase difference. A phase wrapping is determined based on performing a searching algorithm on the different candidate positions. A depth value for the sensor is calculated based on the phase difference and the phase wrapping determined from performing the searching algorithm. A matrix of pixels is outputted from the camera. Each pixel of the matrix includes a depth value.

20 Claims, 7 Drawing Sheets

(51) Int. Cl.
*H04N 5/222* (2006.01)
*H04N 5/232* (2006.01)
*G01S 17/894* (2020.01)

(56) References Cited

U.S. PATENT DOCUMENTS

| | | | |
|---|---|---|---|
| 6,456,793 | B1 | 9/2002 | Ray et al. |
| 6,775,006 | B2* | 8/2004 | Groot ................ G01B 11/0608 356/497 |
| 7,187,452 | B2 | 3/2007 | Jupp et al. |
| 7,420,656 | B1 | 9/2008 | Sandusky et al. |
| 7,475,014 | B2* | 1/2009 | Smaragdis ............ G10L 21/028 381/17 |
| 8,780,113 | B1 | 7/2014 | Ciurea et al. |
| 9,165,368 | B2 | 10/2015 | Rafii et al. |
| 9,582,889 | B2* | 2/2017 | Shpunt .................... G06T 7/521 |
| 9,602,807 | B2 | 3/2017 | Crane et al. |
| 9,625,569 | B2 | 4/2017 | Lange |
| 9,760,837 | B1* | 9/2017 | Nowozin ............. G06K 9/6256 |
| 2010/0140461 | A1 | 6/2010 | Sprigle et al. |
| 2012/0287247 | A1 | 11/2012 | Stenger et al. |
| 2013/0177236 | A1 | 7/2013 | Kim et al. |
| 2014/0168369 | A1 | 6/2014 | Crane et al. |
| 2014/0313376 | A1 | 10/2014 | Van nieuwenhove et al. |
| 2015/0371440 | A1 | 12/2015 | Pirchheim et al. |
| 2016/0231866 | A1 | 8/2016 | Tretter et al. |
| 2017/0272651 | A1 | 9/2017 | Mathy et al. |
| 2018/0122086 | A1 | 5/2018 | Lu et al. |
| 2018/0343432 | A1 | 11/2018 | Duan et al. |
| 2018/0349322 | A1* | 12/2018 | Cumings ................ G06F 30/20 |
| 2019/0355136 | A1 | 11/2019 | Ortiz egea et al. |

OTHER PUBLICATIONS

Droeschel, et al., "Multi-Frequency Phase Unwrapping for Time-of-Flight Cameras", In Proceedings of IEEE/RSJ International Conference on Intelligent Robots and Systems, Oct. 18, 2010, 7 Pages.

Kirmani, et al., "SPUMIC: Simultaneous Phase Unwrapping and Multipath Interference Cancellation in Time-of-Flight Cameras Using Spectral Methods", In Proceedings of IEEE International Conference on Multimedia and Expo, Jul. 15, 2013, 6 Pages.

Kumar, et al., "Low Power Time-of-Flight 3D Imager System in Standard CMOS", In Proceedings of 19th IEEE International Conference on Electronics, Circuits and Systems, Dec. 9, 2012, pp. 941-944.

Li, Larry, "Time-of-Flight Camera—An Introduction", In Technical White Paper, Jan. 2014, 10 Pages.

Hansard et al., "Time of Flight Cameras: Principles, Methods, and Applications" Springer Briefs in Computer Science, Nov. 2012, 102 pages.

Bamji et al., "A 0.13 μm CMOS System-on-Chip for a 512 × 424 Time-of-Flight Image Sensor With Multi-Frequency Photo-Demodulation up to 130 MHz and 2 GS/s ADC," IEEE Journal of Solid-State Circuits, vol. 50, No. 1, Jan. 2015, 17 pages.

Crabb, et al., "Fast single-frequency time-of-flight range imaging", In Proceedings of IEEE Conference on Computer Vision and Pattern Recognition Workshops, Jun. 7, 2015, pp. 58-65.

Droeschel, et al., "Probabilistic Phase Unwrapping for Time-of-Flight Camera", In Proceedings of 41st International Symposium on Robotics, Jun. 7, 2010, pp. 318-324.

"International Search Report and Written Opinion Issued in PCT Application No. PCT/US2019/029529", dated Jun. 28, 2019, 11 Pages.

"International Search Report and Written Opinion Issued in PCT Application No. PCT/US2019/030783", dated Aug. 20, 2019, 10 Pages.

Garcia, et al. "Spatio-temporal Tof Data Enhancement by Fusion", In Proceedings of 19th IEEE International Conference on Image Processing, Sep. 30, 2012, 4 Pages.

"Notice of Allowance Issued in U.S. Appl. No. 15/983,054", dated Nov. 29, 2019, 8 Pages.

* cited by examiner

PHASE WRAPPING DETERMINATION FOR TIME-OF-FLIGHT CAMERA

BACKGROUND

A time-of-flight (ToF) camera may determine a distance between a subject and the ToF camera based on the known speed of light by measuring the time-of-flight of a light signal between the camera and the subject. For example, the light signal may be modulated in amplitude temporally to illuminate the subject. The back-reflected light signal may be acquired by a sensor array of the ToF camera and the amplitude of the back-reflected light signal may be evaluated to determine a phase difference. The distance that the light signal travels from the source to the subject may be determined based on the phase difference $\phi$ as given by Equation 1, where d is the distance, f is the modulation frequency, and c is the speed of light.

$$\phi = 4\pi d f c \qquad \text{Equation 1}$$

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A time-of-flight (ToF) camera is configured to illuminate a subject with infrared light (IR) light. For each sensor of a sensor array, camera space coordinates of a locus of the subject are determined based on the measured IR light. The camera space coordinates include a phase difference between emitted IR light and reflected IR light. A plurality of candidate positions of the locus of the subject are determined in world space based on the camera space coordinates. Each candidate position corresponds to a different phase wrapping of the phase difference. A phase wrapping is determined based on performing a searching algorithm on the different candidate positions. A depth value for the sensor is calculated based on the phase difference and the phase wrapping determined from performing the searching algorithm. A matrix of pixels is outputted from the camera. Each pixel of the matrix includes a depth value.

DETAILED DESCRIPTION

A time-of-flight (ToF) camera may determine the depth of a subject based on the phase difference of a light signal that is temporally modulated in amplitude. However, if the subject is positioned at a distance that makes the phase difference greater than $2\pi$, then the subject may be confused with another object that is placed at a distance that is a multiple of $2\pi$. The number of periods added to the phase difference that equates to the distance may be referred to as the 'phase wrapping.' To solve this issue, in one example, the modulation frequency of the light signal may be reduced such that the phase difference is not phase wrapped. However, a depth evaluation determined based on the lower modulation frequency light signal may be less accurate relative to a depth evaluation of a light signal having a higher modulation frequency. In another example, a ToF camera can modulate the light signal using several different modulation frequencies to produce a sparse solution space from which the phase wrapping of the phase difference can be determined. However, this multi-frequency modulation approach requires additional image captures that increases power consumption of the ToF camera relative to a single frequency modulation approach.

Figure 1:
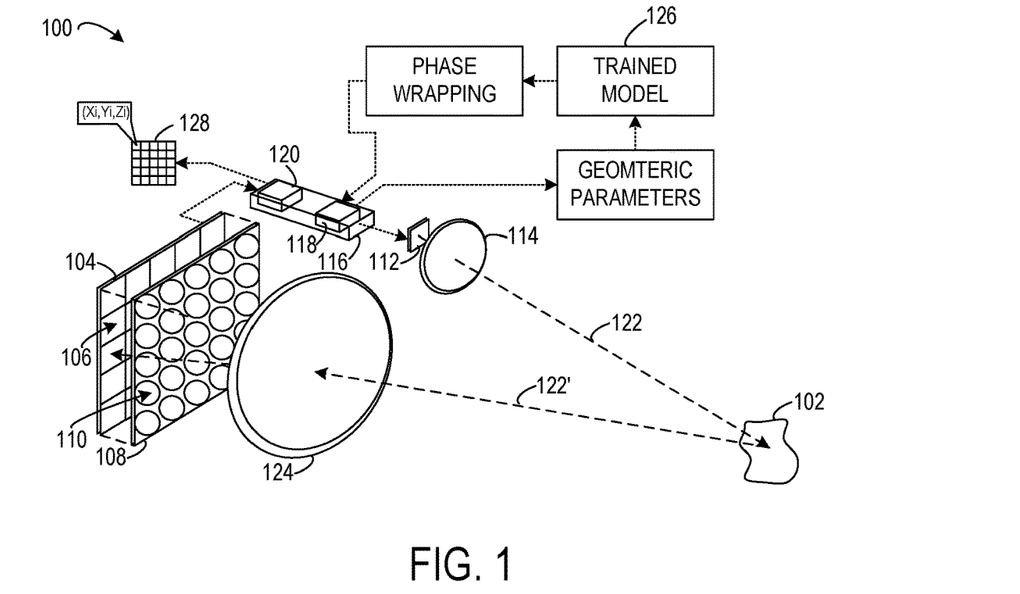
FIG. 1 is an exploded, schematic view showing aspects of an example time-of-flight (ToF) camera.

Accordingly, this disclosure is directed to an approach for determining the phase wrapping of the phase difference using a single modulation frequency. FIG. 1 shows aspects of an example ToF camera 100 configured to resolve the phase wrapping using a single modulation frequency. The term 'camera' refers herein to any imaging component having at least one optical aperture and sensor array configured to image a scene or subject 102. Camera 100 includes a sensor array 104 of individually addressable sensors 106. In some implementations, the sensors may be complementary metal-oxide semiconductor (CMOS) elements, but other suitable architectures are also envisaged. Each sensor may be responsive to light over a broad wavelength band, although this is not required. For silicon-based sensors, the wavelength response may range from 300 to 1100 nm, for example. Sensor array 104 is schematically illustrated with only twenty-five sensors 106 for simplicity, although there is no theoretical limitation to the number of sensors 106.

Microlens array 108 optionally may be arranged directly over sensor array 104. Microlens array 108 includes a plurality of microlens elements 110. Each microlens element 110 of microlens array 108 may be registered to a sensor 106 of the sensor array 104. When included, microlens array 108 may provide a larger effective fill factor at each of the sensors, for increased collection efficiency and reduced cross-talk between pixels.

A time-of-flight illuminator 112 is configured to emit active IR light to illuminate the subject 102. In one example, the time-of-flight illuminator 112 includes an IR laser configured to emit IR light. In some implementations, the time-of-flight illuminator 112 optionally may include a diffuser 114 covering a field of illumination of the time-of-flight illuminator 112. In this disclosure, the term 'infrared' (IR) light includes so called near-infrared (NIR) wavelengths of about 850 nm. Depth measurements may be taken using IR light, including NIR light, or any other suitable wavelength. Although not shown in FIG. 1, the camera optionally may include a bandpass filter to limit the portion of the electromagnetic spectrum reaching the sensors 106 to the portion of the electromagnetic spectrum emitted by the time-of-flight illuminator 112.

Electronic controller 116 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 116 includes a time-of-flight controller machine 118 and an output machine 120 that may be operatively connected to the sensor array 104 and/or the time-of-flight illuminator 112. Machines 118 and 120 may be implemented as separate physical hardware and/or firmware components or incorporated into a single hardware and/or firmware component.

The time-of-flight controller machine 118 is configured to repeatedly (e.g., periodically) activate the time-of-flight illuminator 118 and synchronously address the sensors 106 of sensor array 104 to acquire IR images. The active light signal emitted from the time-of-flight illuminator 116 may be modulated in a single frequency. In the illustrated example, the time-of-flight controller machine 118 activates the time-of-flight illuminator 112 to illuminate the subject 102 with active IR light 122 and addresses the sensors 106 of sensor array 104 in synchronicity. IR light 122' reflects from the subject 102 back to the camera 100. The reflected IR light 122' passes through receiving optics 124 and is incident on the sensors 106 of the sensor array 104 to provide a measurement. For example, in the illustrated example, IR light 122' is measured by a sensor 106 of sensor array 104, thus providing phase information useable with the knowledge of the camera's configuration to determine the world space position of a locus of subject 102.

Figure 2:
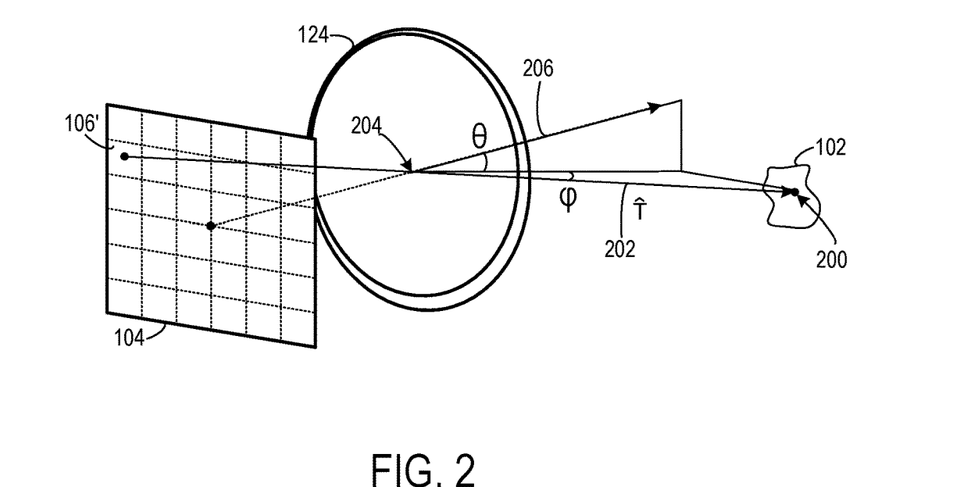
FIG. 2 schematically shows example camera space coordinates of a locus of a subject imaged by a sensor of a ToF camera.

FIG. 2 illustrates the geometry of an example locus 200 of the subject 102 imaged by sensor 106' of sensor array 104. The locus 200 is represented in camera space coordinates: $R3(\varphi, \theta, \phi)$. The camera space coordinates include the azimuth angle $\varphi$, the elevation angle $\theta$, and the potentially phase wrapped phase difference $\phi$ between the active IR light emitted from the time-of-flight illuminator 112 and the active IR light reflected from the locus of the subject 102 back to the sensor 106. Note that each sensor of sensor array 104 may image a locus of the subject 102 (or another reflection surface in the camera's field of view) that may be represented by a different set of camera space coordinates.

As discussed above, if the subject 102 is positioned at a distance that makes the phase difference greater than $2\pi$, then distance of the subject may be indistinguishable from multiple possible positions without knowing the particular phase wrapping (e.g., number of periods (n)) of the phase difference. As such, the time-of-flight controller machine 118 may be configured to determine the phase wrapping of the phase difference in order to accurately determine the distance of the subject 102. Determining the phase wrapping allows the camera space coordinates of the locus 200 to be translated to definitive world space coordinates. In one example, the time-of-flight controller machine 118 may be configured to convert the camera space coordinates of the locus 200 of the subject 102 imaged by the sensor 106 into world space coordinates using the cosine director $\hat{T}$ of each sensor 106. The cosine director $\hat{T}$ for each sensor 106 represents a line segment 202 that extends from the center of the sensor 106 along a trajectory imaged by that particular sensor. The cosine director $\hat{T}$ for each sensor is dependent on the optical configuration of the camera, an intersection of an exit pupil plane 204 of the receiving optics 124, and the optical axis 206 of the camera. The position of the locus 200 of the subject 102 may be represented in Euclidean space $R3(x, y, z)$ in the world space coordinate system. The time-of-flight controller machine 118 may be configured to convert the camera space coordinates of each locus of the subject 102 imaged by each of the sensors of the sensor array 104 into world space coordinates in the same manner.

Figure 3:
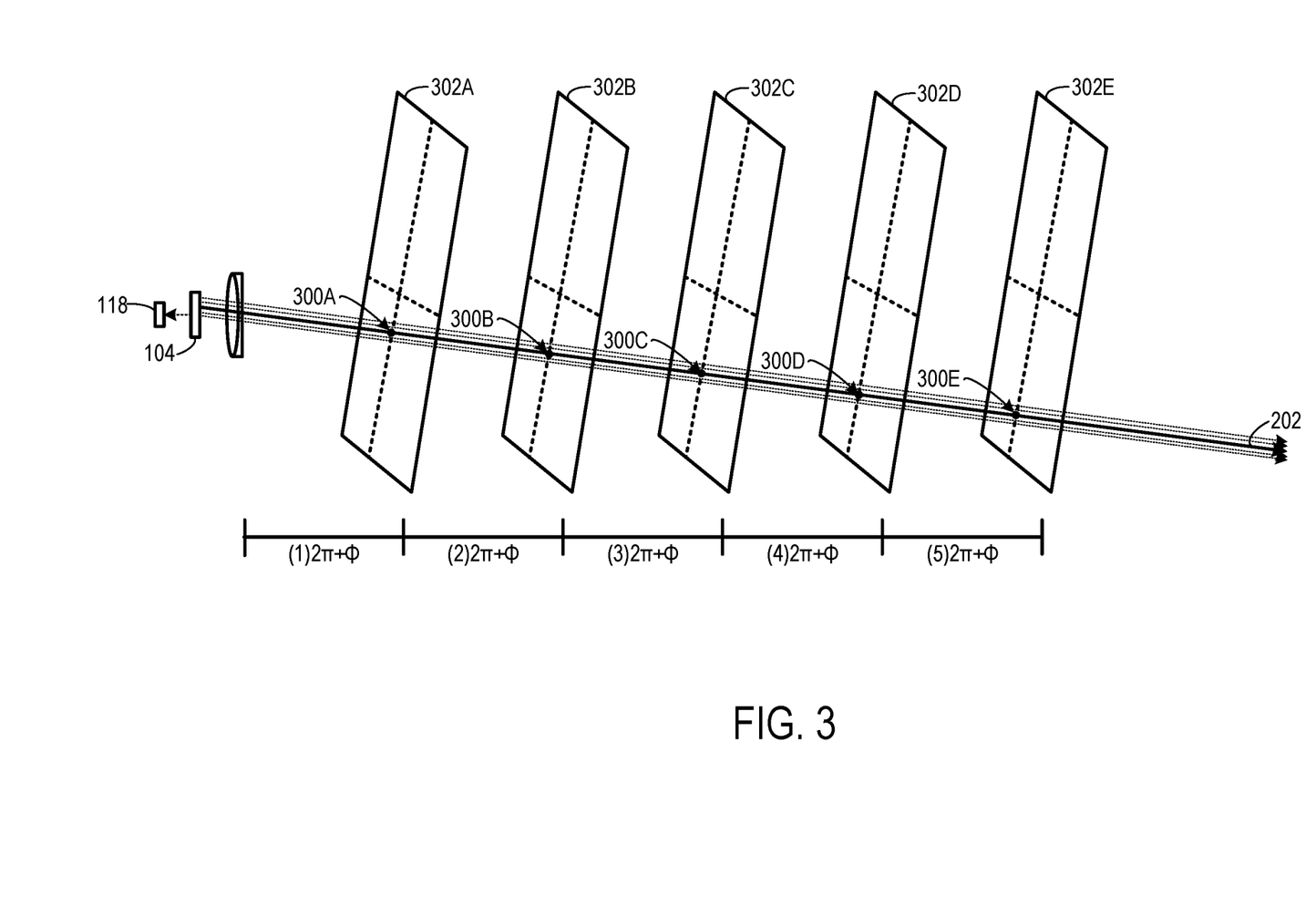
FIG. 3 schematically shows different surfaces representing a subject at different candidate positions in world space corresponding to different potential phase wrappings of a phase difference.

As schematically shown in FIG. 3, the time-of-flight controller machine 118 may be configured to determine a plurality of candidate positions 300 (e.g., 300A, 300B, 300C, 300D, 300E) of the locus of the subject imaged by the sensor in world space based on the camera space coordinates. Each candidate position 300 of the locus may correspond to a different phase wrapping of the phase difference such that the different candidate positions of the locus are located at different positions along the projected line segment 202. The number of positions selected for evaluation as the plurality of candidate positions may be based on an illumination power level and/or a modulation frequency of the time-of-flight illuminator 112. For example, a higher power level illumination source may enable a light signal to travel further such that additional phase wrappings may be evaluated, and vice versa.

The time-of-flight controller machine 118 may be configured, for each phase wrapping, to fit an analytic function to candidate positions of the locus (indicated by solid line) imaged by the sensor and neighboring loci (indicated by dotted lines) imaged by neighboring sensors. For each phase wrapping, the analytic function may be fit to any suitable number of candidate positions. For example, the number of candidate positions may include 1×3, 1×5, 3×3, or 5×5 groupings of sensors to which the analytic function may be fit.

It will be appreciated that any suitable type of analytic function may be fit to the candidate positions to model the surface of the subject being imaged. In some examples, the analytic function may model the surface of the subject as a plane. Although a plane may be a simple three-dimensional (3D) representation of the surface of the subject, such a representation may have various benefits. For example, a plane may be fast to compute, a line segment in world space will always intersect the plane, the normals are simple coefficients, and the curvature is zero. In another example, the surface of the subject being imaged may be modeled as a quadric surface. A quadric surface may generalize conic sections (e.g., ellipses, parabolas, and hyperbolas) including non-degenerate real surfaces (e.g., ellipsoids spheres, ellipsoids, paraboloids or hyperboloid) and real degenerate surfaces (e.g., cones or cylinders). The analytic function for the quadric surface may be more complex than the plane, but the quadric surface may provide a more detailed geometric characterization of the surface of the subject.

In the illustrated example, the plurality of candidate positions of the locus and neighboring loci at each phase wrapping are fit to different analytic functions representing planar surfaces 300 (e.g., 300A, 300B, 300C, 300D, 300E). In particular, the analytic function represented by planar surface 300A is fit to candidate positions of a first period $((1)2\pi+\phi)$ of the phase wrapping, the analytic function represented by planar surface 300B is fit to candidate positions of a second period $((2)2\pi+\phi$ or $4\pi+\phi)$ of the phase wrapping, the analytic function represented by planar surface 300C is fit to candidate positions of a third period $((3)2\pi+\phi$ or $6\pi+\phi)$ of the phase wrapping, the analytic function represented by planar surface 300D is fit to candidate positions of a fourth period $((4)2\pi+\phi$ or $8\pi+\phi)$ of the phase wrapping, and the analytic function represented by planar surface 300E is fit to candidate positions of a fifth period $((5)2\pi+\phi$ or $10\pi+\phi)$ of the phase wrapping.

The time-of-flight controller machine 118 may be configured to determine the phase wrapping of the phase difference using one of a variety of different searching algorithms. In one example, the time-of-flight controller machine 118 may be configured to determine the phase wrapping that produces a smallest deviation between the fitted analytic function and the candidate positions of the loci imaged by the sensor and by neighboring sensors. The time-of-flight controller machine 118 may be configured to calculate a depth value based on the phase difference and the phase wrapping that produces the smallest deviation. The time-of-flight controller machine 118 may be configured to calculate the depth value of each sensor of the sensor array 104 in the same manner.

The time-of-flight controller machine 118 may use any suitable analysis to determine the deviation between the fitted analytic functions and the candidate positions at the different phase wrappings. In one example, time-of-flight controller machine 118 may use a least squares analysis to determine the smallest deviation between the positions of the loci and the fitted function. The time-of-flight controller machine 118 may be configured to perform the smallest deviation searching algorithm in the same manner for analytic functions that model planes and analytic function that model quadric or other surfaces.

In some implementations, the time-of-flight controller machine 118 may be configured to dynamically determine how to model the subject (e.g., as a plane or quadric surface) based on a signal-to-noise ratio of the active IR light measured by the sensor array 104. For example, if the measured signal has a higher signal-to-noise ratio, then the time-of-flight controller machine 118 may model the subject as a quadric surface. On the other hand, if the measured signal has a lower signal-to-noise ratio, then the time-of-flight controller machine 118 may model the subject as a planar surface.

In another example where the candidate positions of the loci of the subject imaged by the sensors are fit to a quadric surface, the time-of-flight controller machine 118 may be configured to determine the phase wrapping of the phase difference using a searching algorithm that minimizes the curvature of the quadric surface. In particular, the time-of-flight controller machine 118 may be configured, for each phase wrapping, to calculate a curvature of a quadric surface fitted to candidate positions of the locus imaged by the sensor and neighboring loci imaged by neighboring sensors. The time-of-flight controller machine 118 may be configured to determine the phase wrapping that produces a smallest curvature of the fitted quadric surfaces and calculate a depth value based on the phase difference and the phase wrapping that produces the smallest curvature. The time-of-flight controller machine 118 may be configured to calculate the depth value of each sensor of the sensor array 104 in the same manner.

In another example, the time-of-flight controller machine 118 may be configured to determine the phase wrapping of the phase difference using a probabilistic searching algorithm that uses a trained model. For this approach, the time-of-flight controller machine 118 may be configured to determine geometric parameters for a modulation frequency of the active IR light based on camera space coordinates of loci of the subject imaged by a sensor and neighboring sensors. For example, the geometric parameters may include the normals and/or curvature of an analytic function that is fit to the camera space coordinates of the loci of the subject imaged by the sensor and neighboring sensors. The time-of-flight controller machine 118 may be configured to provide the geometric parameters as input to a trained model 126 (shown in FIG. 1). The trained model 126 may be configured to compare the geometric parameters derived from the measured active IR light to geometric parameters of a plurality of analytic functions modeling different surfaces having different positions and orientations in world space. For example, the plurality of different modeled surfaces may have different orientations, distances and direction cosines. The trained model 126 may be configured to identify an analytic function of the plurality of analytic functions that most closely matches the geometric parameters of the measured active IR light. For example, the geometric parameters such as the normals may be matched to corresponding normals of the analytic function. The trained model 126 may be configured to identify an analytic function that most closely matches the geometric parameters in any suitable manner. The trained model 126 may be configured to output a phase wrapping of the phase difference calculated based on the identified analytic function. The time-of-flight controller machine 118 may be configured to calculate a depth value for the sensor based on the phase difference and the phase wrapping output from the trained model.

The trained model 126 may take any suitable form. In some implementations, the trained model may include a regression model that is implemented as a lookup table. In some implementations, the trained model may be implemented as a neural network. In some implementations, the trained model may be implemented using another form of machine learning. The trained model 126 may be trained with any suitable number of different analytic functions.

The time-of-flight controller machine 118 may be configured to calculate a depth value for each sensor 106 of the sensor array 104 using any of the searching algorithms described above. Note that the time-of-flight controller machine 118 may acquire a plurality of IR images in the process of acquiring a depth map. Further, note that the IR light signal used to acquire each IR image may have the same modulation frequency.

The term 'depth map' refers to an array of pixels registered to corresponding regions (Xi, Yi) of an imaged scene, with a depth value $Z_i$ indicating, for each pixel, the depth of the corresponding region. 'Depth' is defined as a coordinate parallel to the optical axis of the camera, which increases with increasing distance from the camera. The term 'depth video' refers herein to a time-resolved sequence of depth maps.

The output machine 120 is configured to output a matrix of pixels 128. Each pixel in the matrix 128 includes a depth value (Zi) corresponding to a different sensor 106 of sensor array 104. The output machine 120 may be configured to output the matrix of pixels 128 in any suitable form. In some examples, the output machine 120 may output the matrix of pixels 128 as a data structure in which each element of the matrix corresponds to a different pixel. In some examples, the output machine 120 may be configured to output a set of normals of the analytic function (e.g., plane or quadric) that represents the surface of the subject 102. In some examples, the output machine 120 may be configured to output the curvature of a quadric surface that represents the surface of the subject 102.

Figure 4A:
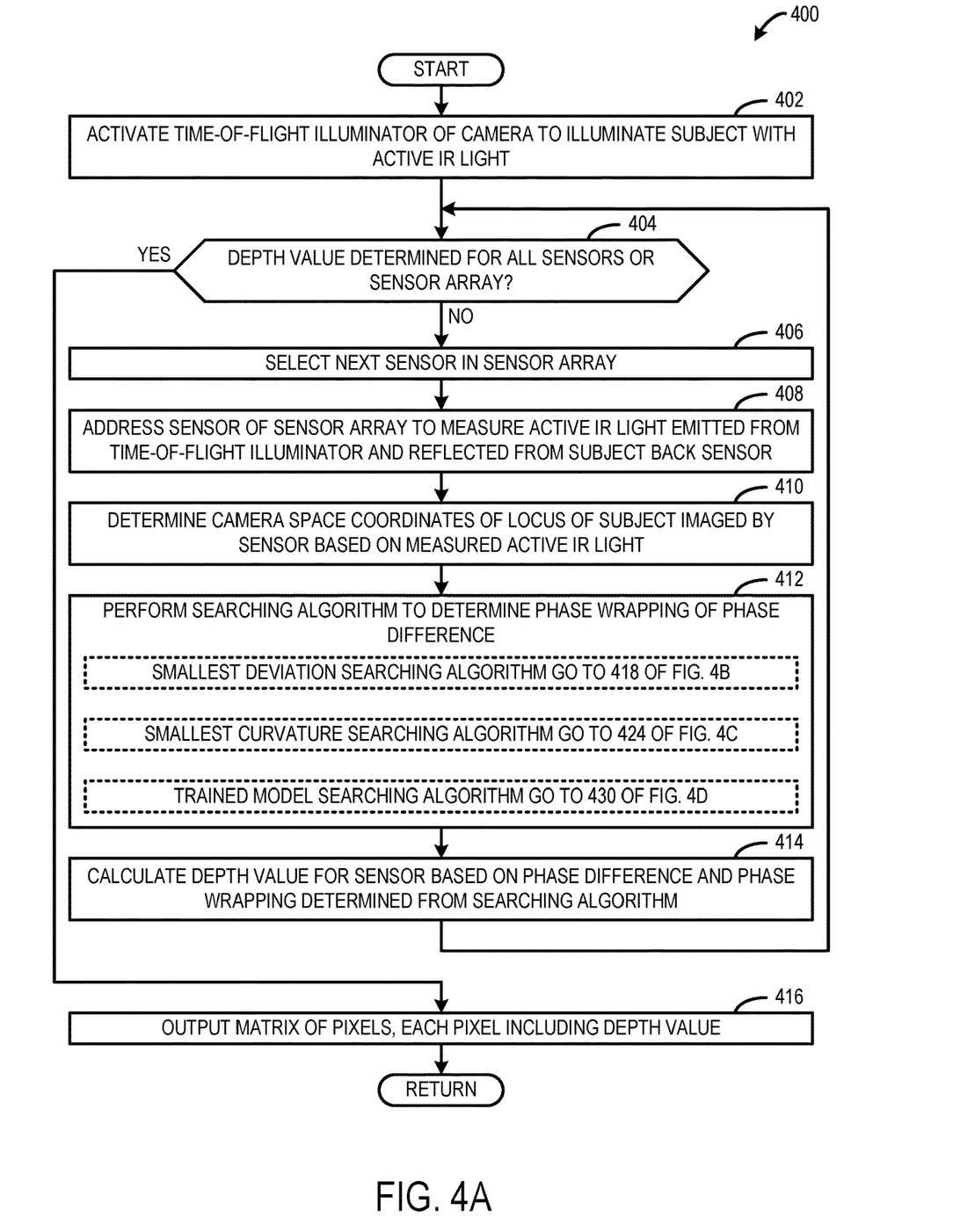
FIGS. 4A-4D show example methods for determining a wrapped-phase distance of a subject illuminated by a single modulation frequency ToF camera.
Figure 4B:
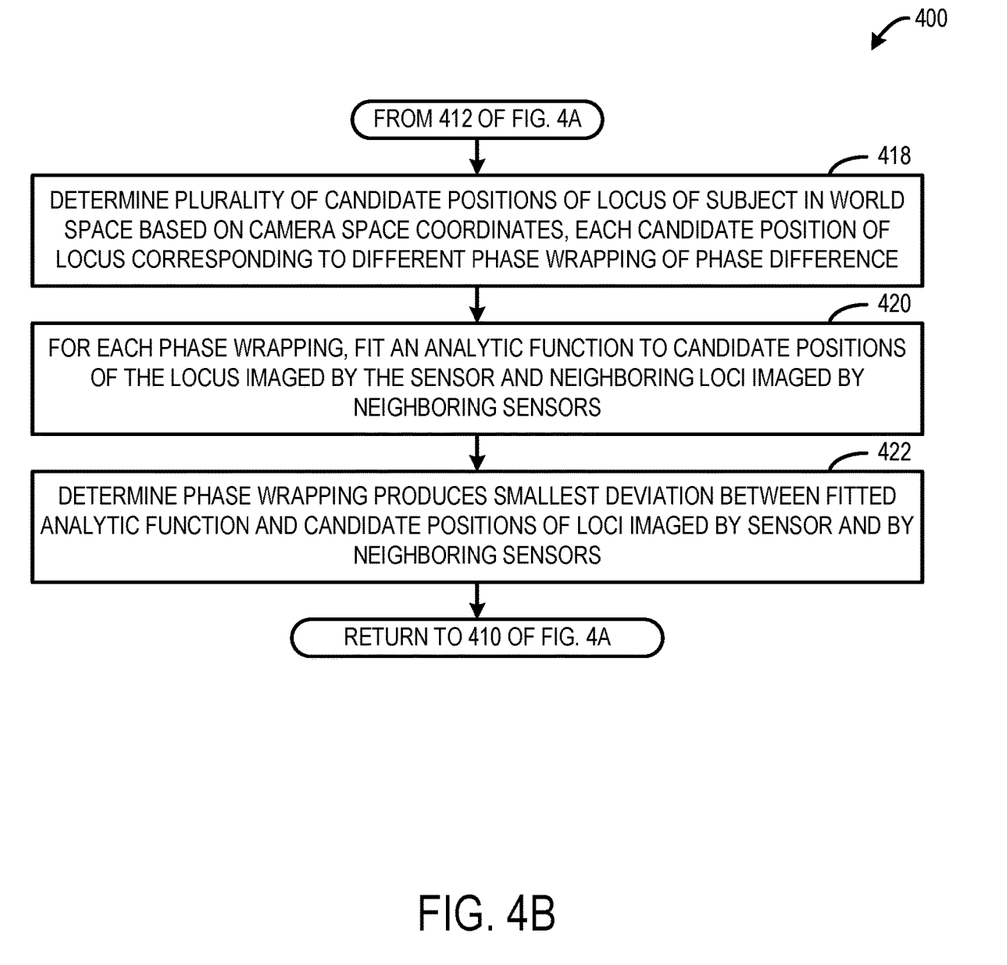

FIGS. 4A-4B depict a flowchart of an example method 400 for determining a phase wrapping of a phase difference in a depth calculation of a ToF camera. For example, method 400 may be enacted by electronic controller 116 of camera 100.

In FIG. 4A, at 402 of method 400, a time-of-flight illuminator of a ToF camera is activated to illuminate a subject with active IR light. At 404 of method 400, it is determined whether depth values have been determined for all sensors of a sensor array of the ToF camera. If depth values have been determined for all sensors of the sensor array, then method 400 moves to 416. Otherwise, method 400 moves to 406. At 406 of method 400, a next sensor in the sensor array is selected to acquire time-of-flight data. At 408 of method 400, the sensor is addressed to measure the active IR light reflected from the subject back to the sensor. At 410 of method 400, camera space coordinates of a locus of the subject imaged by the sensor are determined based on the measured active IR light. The camera space coordinates are spherical coordinates including an azimuth angle and an elevation angle to the locus of the subject, and a phase difference between the active IR light emitted from the time-of-flight illuminator and the active IR light reflected from the locus of the subject back to the sensor. At 412 of method 400, a searching algorithm is performed to determine a phase wrapping of the phase difference. In some examples, a smallest deviation algorithm may be performed to determine the phase wrapping, and method 400 moves to 416 shown in FIG. 4B. In some examples, a smallest curvature algorithm may be performed to determine the phase wrapping, and method 400 moves to 424 shown in FIG. 4C. In some examples, a probabilistic searching algorithm that uses a trained model may be performed to determine the phase wrapping, and method moves to 432 shown in FIG. 4D. At 414 of method 400, a depth value of the sensor is calculated based on the phase difference and the phase wrapping determined from the searching algorithm. Method 400 returns to 404 to determine if depth values have been determined for all sensors of the sensor array. If depth values have been determined for all of the sensors, then method 400 moves to 416. At 514 of method 400, a matrix of pixels is outputted. Each pixel of the matrix includes a depth value.

FIG. 4B shows an example smallest deviation searching algorithm that optionally may be performed as part of method 400 to determine a phase wrapping of a phase difference. At 418 of method 400, a plurality of candidate positions of the locus of the subject are determined in world space based on the camera space coordinates. Each candidate position of the locus corresponds to a different phase wrapping of the phase difference. At 420 of method 400, for each phase wrapping, an analytic function is fit to the candidate positions of the locus imaged by the sensor and neighboring loci imaged by neighboring sensors. At 422, the phase wrapping that produces a smallest deviation between the fitted analytic function and the candidate positions of loci imaged by the sensor and by neighboring sensors is determined. When the smallest deviation searching algorithm is performed to determine the phase wrapping, in FIG. 4A, at 414 of method 400, a depth value for the sensor is calculated based on the phase difference and the phase wrapping with the smallest deviation.

Figure 4C:
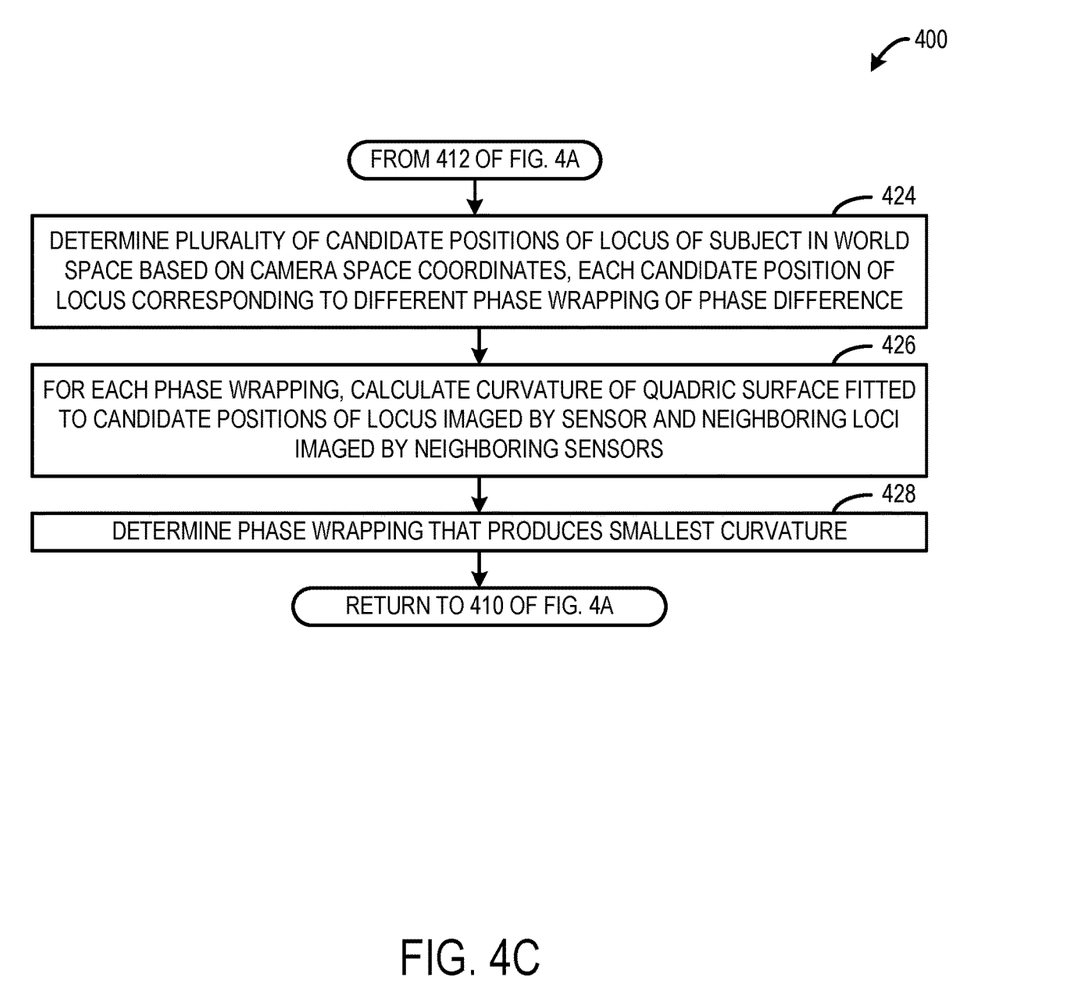

FIG. 4C shows an example smallest curvature searching algorithm that optionally may be performed as part of method 400 to determine a phase wrapping of a phase difference. At 424 of method 400, a plurality of candidate positions of the locus of the subject are determined in world space based on the camera space coordinates. Each candidate position of the locus corresponds to a different phase wrapping of the phase difference. At 426 of method 400, for each phase wrapping, a curvature of a quadric surface fitted to candidate positions of the locus imaged by the sensor and neighboring loci imaged by neighboring sensors is calculated. At 428 of method 400, the phase wrapping that produces a smallest curvature is determined. When the smallest curvature searching algorithm is performed to determine the phase wrapping, in FIG. 4A, at 414 of method 400, a depth value for the sensor is calculated based on the phase difference and the phase wrapping that produces the smallest curvature.

Figure 4D:
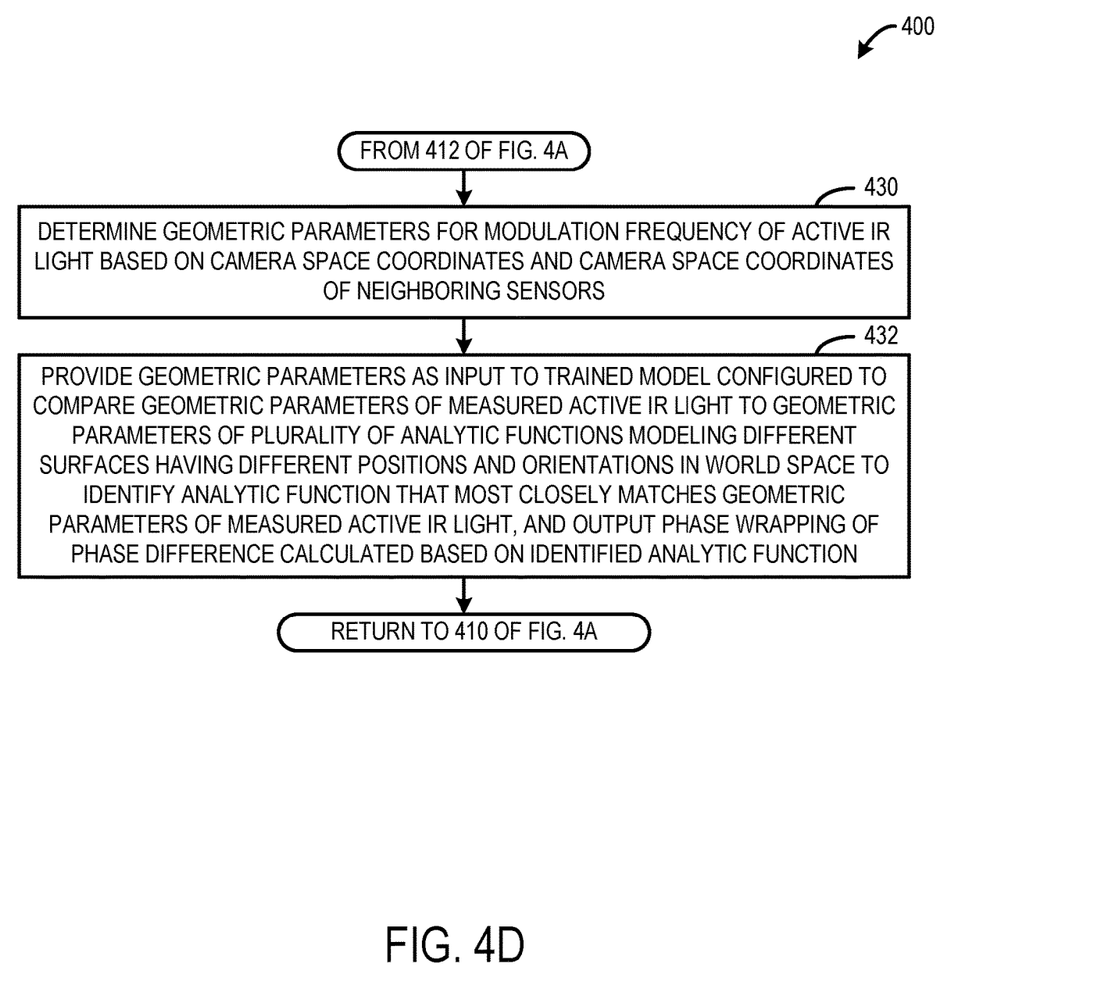

FIG. 4D shows an example trained model searching algorithm that optionally may be performed as part of method 400 to determine a phase wrapping of a phase difference. At 430 of method 400, geometric parameters for a modulation frequency of the active IR light are determined based on the camera space coordinates and camera space coordinates of loci of the subject imaged by the sensor and neighboring sensors. At 432 of method 400, the geometric parameters are provided as input to a trained model. The trained model is configured to compare the geometric parameters of the measured active IR light to geometric parameters of a plurality of analytic functions modeling different surfaces having different positions and orientations in world space. The plurality of analytic functions may include analytic functions that model planes and quadric surfaces in world space. The trained model is configured to identify an analytic function that most closely matches the geometric parameters of the measured active IR light based on the comparison, and output a phase wrapping of the phase difference calculated based on the identified analytic function. When the trained model searching algorithm is performed to determine the phase wrapping, in FIG. 4A, at 414 of method 400, a depth value for the sensor is calculated based on the phase difference and the phase wrapping output from the trained model. In some implementations, the trained model may include a regression model that is implemented as a lookup table. In some implementations, the trained model may be implemented as a neural network.

In some implementations, a set of normals and/or a curvature of the analytic function that models the subject may be output in addition to the matrix of pixels.

In some implementations, the methods and processes described herein may be tied to a computing system of one or more computing devices. In particular, such methods and processes may be implemented as a computer-application program or service, an application-programming interface (API), a library, and/or other computer-program product.

Figure 5:
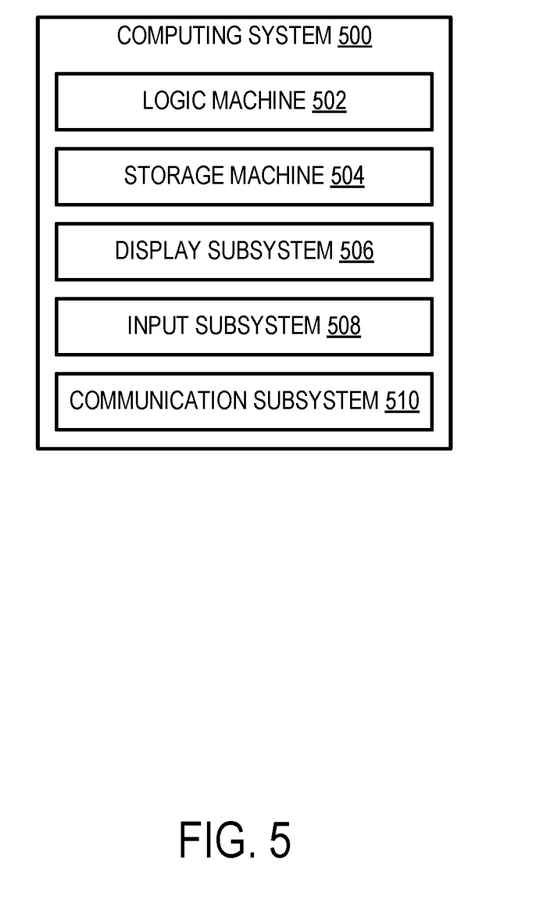
FIG. 5 schematically shows an example computing system.

FIG. 5 schematically shows a non-limiting implementation of a computing system 500 that can enact one or more of the methods and processes described above. Computing system 500 is shown in simplified form. For example, computing system 500 may take the form of camera 100 or electronic controller 116 of FIG. 1.

Computing system 500 includes a logic machine 502 and a storage machine 504. Computing system 500 may optionally include a display subsystem 506, input subsystem 508, communication subsystem 510, and/or other components not shown in FIG. 500.

Logic machine 502 includes one or more physical devices configured to execute instructions. For example, the logic machine 502 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 502 may include one or more processors configured to execute software instructions. Additionally or alternatively, the logic machine 502 may include one or more hardware or firmware logic machines configured to execute hardware or firmware instructions. Processors of the logic machine 502 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 502 may be virtualized and executed by remotely accessible, networked computing devices configured in a cloud-computing configuration.

Storage machine 504 includes one or more physical devices configured to hold instructions executable by the logic machine 502 to implement the methods and processes described herein. When such methods and processes are implemented, the state of storage machine 504 may be transformed—e.g., to hold different data.

Storage machine 504 may include semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 506 may be used to present a visual representation of data held by storage machine 504. This visual representation may take the form of display images translating matrix of pixels 126 into a visual format perceivable by a human. As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem 510 may be configured for communication via a wireless telephone network, or a wired or wireless local- or wide-area network. In some embodiments, the communication subsystem 510 may allow computing system 500 to send and/or receive messages to and/or from other devices via a network such as the Internet.

In an example, a camera comprises a time-of-flight illuminator configured to emit active IR light, a sensor array including a plurality of sensors each configured to measure active IR light, and a time-of-flight controller machine configured to activate the time-of-flight illuminator to illuminate a subject with the active IR light, for each of the plurality of sensors, address the sensor to measure the active IR light reflected from the subject back to the sensor, determine camera space coordinates of a locus of the subject imaged by the sensor based on the measured active IR light, the camera space coordinates including an azimuth angle and an elevation angle to the locus of the subject, and a phase difference between the active IR light emitted from the time-of-flight illuminator and the active IR light reflected from the locus of the subject back to the sensor, determine a plurality of candidate positions of the locus of the subject in world space based on the camera space coordinates, each candidate position of the locus corresponding to a different phase wrapping of the phase difference, for each phase wrapping, fit an analytic function to candidate positions of the locus imaged by the sensor and neighboring loci imaged by neighboring sensors, determine the phase wrapping that produces a smallest deviation between the fitted analytic function and candidate positions of loci imaged by the sensor and by neighboring sensors, and calculate a depth value for the sensor based on the phase difference and the phase wrapping with the smallest deviation, and an output machine operatively connected to the sensor array and configured to output a matrix of pixels, each pixel of the matrix including the depth value for a different sensor of the plurality of sensors of the sensor array. In this example and/or other examples, the smallest deviation between the fitted analytic function and candidate positions of loci imaged by the sensor and by neighboring sensors at the different phase wrappings may be determined based on a least squares analysis. In this example and/or other examples, the analytic function may model a plane. In this example and/or other examples, the analytic function may model a quadric surface. In this example and/or other examples, the output machine may be configured to output a set of normals of the analytic function. In this example and/or other examples, the time-of-flight illuminator may be configured to emit the active IR light in a single modulation frequency. In this example and/or other examples, a number of positions selected as the plurality of candidate positions may be based on an illumination power level of the time-of-flight illuminator and a modulation frequency of the time-of-flight illuminator. In this example and/or other examples, the camera space may be spherical coordinates and the world space may be Euclidean coordinates.

In an example, a camera comprises a time-of-flight illuminator configured to emit active IR light, a sensor array including a plurality of sensors each configured to measure active IR light, and a time-of-flight controller machine configured to activate the time-of-flight illuminator to illuminate a subject with the active IR light, for each of the plurality of sensors, address the sensor to measure the active IR light reflected from the subject back to the sensor, determine camera space coordinates of a locus of the subject imaged by the sensor based on the measured active IR light, the camera space coordinates including an azimuth angle and an elevation angle to the locus of the subject, and a phase difference between the active IR light emitted from the time-of-flight illuminator and the active IR light reflected from the locus of the subject back to the sensor, determine a plurality of candidate positions of the locus of the subject in world space based on the camera space coordinates, each candidate position of the locus corresponding to a different phase wrapping of the phase difference, for each phase wrapping, calculate a curvature of a quadric surface fitted to candidate positions of the locus imaged by the sensor and neighboring loci imaged by neighboring sensors, determine the phase wrapping that produces a smallest curvature, and calculate a depth value for the sensor based on the phase difference and the phase wrapping that produces the smallest curvature, and an output machine operatively connected to the sensor array and configured to output a matrix of pixels, each pixel of the matrix including the depth value for a different sensor of the plurality of sensors of the sensor array. In this example and/or other examples, the output machine may be configured to output a set of normals of the quadric surface. In this example and/or other examples, the output machine may be configured to output the curvature of the quadric surface. In this example and/or other examples, the time-of-flight illuminator may be configured to emit the active IR light in a single modulation frequency. In this example and/or other examples, a number of positions selected as the plurality of candidate positions may be based on an illumination power level of the time-of-flight illuminator and a modulation frequency of the time-of-flight illuminator. In this example and/or other examples, the camera space may be spherical coordinates and the world space may be Euclidean coordinates.

In an example, a camera comprises a time-of-flight illuminator configured to emit active IR light, a sensor array including a plurality of sensors each configured to measure active IR light, and a time-of-flight controller machine configured to activate the time-of-flight illuminator to illuminate a subject with the active IR light, for each of the plurality of sensors, address the sensor to measure the active IR light reflected from the subject back to the sensor, determine camera space coordinates of a locus of the subject imaged by the sensor based on the measured active IR light, the camera space coordinates including an azimuth angle and an elevation angle to the locus of the subject, and a phase difference between the active IR light emitted from the time-of-flight illuminator and the active IR light reflected from the locus of the subject back to the sensor, determine geometric parameters for a modulation frequency of the active IR light based on the camera space coordinates of the locus of the subject imaged by the sensor and camera space coordinates of loci of the subject imaged by neighboring sensors, provide the geometric parameters as input to a trained model configured to compare the geometric parameters of the measured active IR light to geometric parameters of a plurality of analytic functions modeling different surfaces having different positions and orientations in world space to identify an analytic function that most closely matches the geometric parameters of the measured active IR light, and output a phase wrapping of the phase difference calculated based on the identified analytic function, calculate a depth value for the sensor based on the phase difference and the phase wrapping output from the trained model, and an output machine operatively connected to the sensor array and configured to output a matrix of pixels, each pixel of the matrix including the depth value for a different sensor of the plurality of sensors of the sensor array. In this example and/or other examples, the geometric parameters may include normals and a curvature in camera space. In this example and/or other examples, the plurality of analytic functions may include analytic functions that model planes and quadric surfaces in world space. In this example and/or other examples, the trained model may include a regression model implemented as a lookup table. In this example and/or other examples, the trained model may include a neural network. In this example and/or other examples, the trained model may be configured to calculate and output the normals of the surface of the subject in world space, and the output machine may be configured to output the normals of the surface of the subject in world space.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera comprising:
    a time-of-flight illuminator configured to emit active IR light;
    a sensor array including a plurality of sensors each configured to measure active IR light; and
    a time-of-flight controller machine configured to:
        activate the time-of-flight illuminator to illuminate a subject with the active IR light,
        for each of the plurality of sensors,
            address the sensor to measure the active IR light reflected from the subject back to the sensor,
            determine camera space coordinates of a locus of the subject imaged by the sensor based on the measured active IR light, the camera space coordinates including an azimuth angle and an elevation angle to the locus of the subject, and a phase difference between the active IR light emitted from the time-of-flight illuminator and the active IR light reflected from the locus of the subject back to the sensor,
            determine a plurality of candidate positions of the locus of the subject in world space based on the camera space coordinates, each candidate position of the locus corresponding to a different phase wrapping of the phase difference,
            for each phase wrapping, fit an analytic function to candidate positions of the locus imaged by the sensor and neighboring loci imaged by neighboring sensors,
            determine the phase wrapping that produces a smallest deviation between the fitted analytic function and candidate positions of loci imaged by the sensor and by neighboring sensors, and calculate a depth value for the sensor based on the phase difference and the phase wrapping with the smallest deviation; and an output machine operatively connected to the sensor array and configured to output a matrix of pixels, each pixel of the matrix including the depth value for a different sensor of the plurality of sensors of the sensor array.

2. The camera of claim 1, wherein the smallest deviation between the fitted analytic function and candidate positions of loci imaged by the sensor and by neighboring sensors at the different phase wrappings is determined based on a least squares analysis.

3. The camera of claim 1, wherein the analytic function models a plane.

4. The camera of claim 1, wherein the analytic function models a quadric surface.

5. The camera of claim 1, wherein the output machine is configured to output a set of normals of the analytic function.

6. The camera of claim 1, wherein the time-of-flight illuminator is configured to emit the active IR light in a single modulation frequency.

7. The camera of claim 1, wherein a number of positions selected as the plurality of candidate positions is based on an illumination power level of the time-of-flight illuminator and a modulation frequency of the time-of-flight illuminator.

8. The camera of claim 1, wherein the camera space is spherical coordinates and the world space is Euclidean coordinates.

9. A camera comprising:
a time-of-flight illuminator configured to emit active IR light;
a sensor array including a plurality of sensors each configured to measure active IR light; and
a time-of-flight controller machine configured to:
activate the time-of-flight illuminator to illuminate a subject with the active IR light,
for each of the plurality of sensors,
address the sensor to measure the active IR light reflected from the subject back to the sensor,
determine camera space coordinates of a locus of the subject imaged by the sensor based on the measured active IR light, the camera space coordinates including an azimuth angle and an elevation angle to the locus of the subject, and a phase difference between the active IR light emitted from the time-of-flight illuminator and the active IR light reflected from the locus of the subject back to the sensor,
determine a plurality of candidate positions of the locus of the subject in world space based on the camera space coordinates, each candidate position of the locus corresponding to a different phase wrapping of the phase difference,
for each phase wrapping, calculate a curvature of a quadric surface fitted to candidate positions of the locus imaged by the sensor and neighboring loci imaged by neighboring sensors,
determine the phase wrapping that produces a smallest curvature, and
calculate a depth value for the sensor based on the phase difference and the phase wrapping that produces the smallest curvature; and
an output machine operatively connected to the sensor array and configured to output a matrix of pixels, each pixel of the matrix including the depth value for a different sensor of the plurality of sensors of the sensor array.

10. The camera of claim 9, wherein the output machine is configured to output a set of normals of the quadric surface.

11. The camera of claim 9, wherein the output machine is configured to output the curvature of the quadric surface.

12. The camera of claim 9, wherein the time-of-flight illuminator is configured to emit the active IR light in a single modulation frequency.

13. The camera of claim 9, wherein a number of positions selected as the plurality of candidate positions is based on an illumination power level of the time-of-flight illuminator and a modulation frequency of the time-of-flight illuminator.

14. The camera of claim 9, wherein the camera space is spherical coordinates and the world space is Euclidean coordinates.

15. A camera comprising:
a time-of-flight illuminator configured to emit active IR light;
a sensor array including a plurality of sensors each configured to measure active IR light; and
a time-of-flight controller machine configured to:
activate the time-of-flight illuminator to illuminate a subject with the active IR light,
for each of the plurality of sensors,
address the sensor to measure the active IR light reflected from the subject back to the sensor,
determine camera space coordinates of a locus of the subject imaged by the sensor based on the measured active IR light, the camera space coordinates including an azimuth angle and an elevation angle to the locus of the subject, and a phase difference between the active IR light emitted from the time-of-flight illuminator and the active IR light reflected from the locus of the subject back to the sensor,
determine geometric parameters for a modulation frequency of the active IR light based on the camera space coordinates of the locus of the subject imaged by the sensor and camera space coordinates of loci of the subject imaged by neighboring sensors,
provide the geometric parameters as input to a trained model configured to compare the geometric parameters of the measured active IR light to geometric parameters of a plurality of analytic functions modeling different surfaces having different positions and orientations in world space to identify an analytic function that most closely matches the geometric parameters of the measured active IR light, and output a phase wrapping of the phase difference calculated based on the identified analytic function,
calculate a depth value for the sensor based on the phase difference and the phase wrapping output from the trained model; and
an output machine operatively connected to the sensor array and configured to output a matrix of pixels, each pixel of the matrix including the depth value for a different sensor of the plurality of sensors of the sensor array.

16. The camera of claim 15, wherein the geometric parameters include normals and a curvature in camera space.

17. The camera of claim 15, wherein the plurality of analytic functions includes analytic functions that model planes and quadric surfaces in world space.

18. The camera of claim 15, wherein the trained model includes a regression model implemented as a lookup table.

19. The camera of claim 15, wherein the trained model includes a neural network.

20. The camera of claim 15, wherein the trained model is configured to calculate and output the normals of the surface of the subject in world space, and wherein the output machine is configured to output the normals of the surface of the subject in world space.

* * * * *